United States Patent
Yamazaki et al.

(10) Patent No.: US 7,345,257 B2
(45) Date of Patent: Mar. 18, 2008

(54) NOZZLE PRESETTER FOR LASER MACHINING TOOL OF LASER BEAM MACHINE

(75) Inventors: Tsunehiko Yamazaki, Niwa gun (JP); Naoomi Miyakawa, Niwa gun (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 498 days.

(21) Appl. No.: 11/121,436

(22) Filed: May 4, 2005

(65) Prior Publication Data
US 2005/0263509 A1 Dec. 1, 2005

(30) Foreign Application Priority Data
May 26, 2004 (JP) .............................. 2004-155948

(51) Int. Cl.
*B23K 26/04* (2006.01)
*B23K 26/06* (2006.01)

(52) U.S. Cl. .............................. 219/121.6; 219/121.67; 219/121.83

(58) Field of Classification Search ............. 219/121.6, 219/121.73, 121.78, 121.83
See application file for complete search history.

(56) References Cited

U.S. PATENT DOCUMENTS

| | | | | |
|---|---|---|---|---|
| 4,427,873 A | * | 1/1984 | Orita et al. | 219/121.7 |
| 5,969,335 A | * | 10/1999 | Karasaki | 250/205 |
| 6,371,004 B1 | * | 4/2002 | Peterson | 89/145 |
| 6,528,762 B2 | * | 3/2003 | Mayer | 219/121.83 |
| 6,588,808 B1 | * | 7/2003 | Sheppard | 291/41 |
| 6,667,459 B1 | * | 12/2003 | Woods et al. | 219/121.84 |
| 6,934,014 B1 | * | 8/2005 | Kleinhuber | 356/72 |
| 6,940,037 B1 | * | 9/2005 | Kovacevic et al. | 219/121.64 |
| 7,129,441 B2 | * | 10/2006 | Yamazaki et al. | 219/121.78 |
| 7,140,216 B2 | * | 11/2006 | Garza | 72/53 |
| 2006/0121154 A1 | * | 6/2006 | Manning | 425/564 |

FOREIGN PATENT DOCUMENTS

| | | | | |
|---|---|---|---|---|
| EP | WO2006128663 A1 | * | 12/2006 | |
| JP | 360221187 A | * | 11/1985 | |
| JP | 405305475 A | * | 11/1993 | |
| JP | 406328281 A | * | 11/1994 | |
| JP | 2003-170287 | | 6/2003 | |
| JP | 2003-225287 | | 8/2003 | |
| JP | 02003225787 A | * | 8/2003 | |

* cited by examiner

*Primary Examiner*—Samuel M. Heinrich
(74) *Attorney, Agent, or Firm*—Renner, Otto, Boisselle & Sklar, LLP

(57) ABSTRACT

The invention provides a nozzle presetter for laser machining tool of laser beam machine for externally making position adjustments of nozzles for laser machining tools mounted on a laser beam machine.

A nozzle presetter 900 has a base 910, and a support portion 912 is mounted on an upper part of the base 910 to removably support a laser machining tool 60. An alternative beam source 920 is mounted at the center position in an upper part of the support portion 912. A target member 930 is removably mounted on a nozzle mounting member 660 of the laser machining tool 60 via mounting means 654. The target member 930 has a photoreceptor 940 mounted just under a center hole 932. The photoreceptor 940 senses the quantity of light reaching the photoreceptor through the center hole 932 of the target member 930. The operator changes the axial position of the nozzle mounting member 660 using four adjustment screws 670. When a collected beam passes through the center hole 932 of the target member 930, output voltage of the photoreceptor 940 rises. When the operator is notified to that effect, he/she completes the adjustment.

5 Claims, 14 Drawing Sheets

NOZZLE PRESETTER FOR LASER MACHINING TOOL OF LASER BEAM MACHINE

The present application is based on and claims priority of Japanese patent application No. 2004-155948 filed on May 26, 2004, the entire contents of which are hereby incorporated by reference.

BACKGROUND OF THE INVENTION

1. Field of the Invention

The present invention relates to a nozzle presetter for a laser machining tool of a laser beam machine, capable of making adjustments outside the laser beam machine in advance so that the center of an optical axis narrowed by a machining lens will coincide with the center of a nozzle in the machining tool to be replaceably mounted on the laser beam machine, and thereby improving productivity and safety of the laser beam machine.

2. Description of the Related Art

Conventionally, a laser beam machine leads a laser beam outputted from a laser oscillator device to a machining lens, focuses it onto the focal position of the machining lens, and machining a workpiece placed near the focal position of the machining lens through instantaneous evaporation.

In addition to the laser beam, the laser beam machine needs an assist gas to hasten an oxidation reaction of the workpiece and discharge molten part of the workpiece quickly. In order for the oxidation reaction and melt discharge to proceed efficiently, the laser beam machine also needs a machining nozzle which achieves an appropriate flux diameter and flow velocity.

To carry out laser machining quickly and accurately in a stable manner using a laser machining tool (hereinafter also referred to as "machining tool") which has the above capabilities, it is necessary to keep the nozzle accurately centered with the optical axis.

Since the machining lens is located near the workpiece, being exposed to workpiece vapor, molten particles, and other contaminants produced in its installation environment, it can always get contaminated with dirt, which lowers its transmittance, causing heat of the laser beam to build up in the machining lens. Consequently, geometry of the machining lens is changed, lowering machining accuracy and even resulting in breakage of the machining lens or otherwise disabling machining.

Thus, the machining lens is a consumable and must be changed as required.

However, the geometry of the machining lens contains a significant degree of inaccuracy for manufacturing reasons and thus, the center of the optical axis does not coincide with the nozzle center. Consequently, the nozzle must be centered with the optical axis each time the machining lens is changed.

To center the nozzle with the optical axis, machining is stopped with a machining tool mounted on the laser beam machine, a target is attached to a nozzle tip, a low-power laser beam is emitted from a laser oscillator device for a short time, the machining nozzle is moved horizontally by manually turning adjustment screws of the nozzle with reference to a burn mark left on the target by the beam, making the nozzle center to coincide with the burn mark.

Also, there is a known centering method which involves mounting a bending mirror on a mirror holder capable of angular adjustments to center the nozzle with the optical axis (see Japanese Patent Laid-Open No. Publication 2003-170287 (Patent Document 1)).

Besides, there is a known centering method in which an optical flat capable of angular adjustments is mounted above a condenser lens, a mirror reflector for use to observe a jet orifice for assist gas and machined hole in the workpiece is mounted below the condenser lens, and the nozzle is centered with the optical axis using the optical flat based on images picked up by a CCD camera via the mirror reflector (see Japanese Patent Laid-Open Publication No. 2003-225287 (Patent Document 2)).

Since the operation of centering the nozzle with the optical axis must be performed on the machine, machining must be stopped temporarily, resulting in reduced productivity. Besides, it requires skill to center the nozzle sufficiently with the burn mark left on the target.

It is not possible to predict when a machining lens needs replacement due to its failure. Besides, such replacement must always be carried out manually. This makes it impossible to accomplish long, unattended operation.

The laser beam directed at the target is a powerful one outputted from a laser oscillator device for machining. Thus, an operation which requires the operator to bring his/her eyes close to the nozzle involves danger.

SUMMARY OF THE INVENTION

The present invention provides a nozzle presetter for laser machining on a laser beam machine to solve the above problems.

A nozzle presetter which externally adjusts a machining tool replaceably mounted on a laser beam machine according to the present invention, comprises, as basic means, a base on which the machining tool is removably mounted, an alternative beam source which is mounted on top of the base and emits a beam in place of a laser beam, a nozzle support member mounted on a body of the machining tool via position adjusting means, a target member removably mounted on the nozzle support member, a photoreceptor installed in opposing relation to a small hole provided in the center of the target member, an amplifier which amplifies output voltage of the photoreceptor, and notification means which displays output of the amplifier.

The position adjusting means of the nozzle support member is four adjustment screws installed at equal intervals around the body of the machining tool. The alternative beam source is a photoreceptor.

The laser beam machine comprises a bed, a pallet which is disposed on the bed and holds a workpiece, a column which moves along an X axis, that is, in a longitudinal axis of the bed, a saddle which is supported by the column and moves along a Y axis orthogonal to the X axis, a machining head which is supported by the saddle and moves along a Z axis perpendicular to a plane formed by the X axis and Y axis, and a tool change magazine disposed at an automatic tool change position outside a machining area. The laser machining tool comprises a torch which has optical means including a condenser lens, and a nozzle which is replaceably attached to the tip of the torch.

According to the present invention, since the operation of centering the nozzle with the optical axis can be performed in advance outside the laser beam machine, there is no need to interrupt a machining operation. This greatly improves productivity.

Since laser machining tools can be set up outside the machine, machining can be performed immediately after exchanging laser machining tools between the laser beam machine and nozzle presetter. This greatly improves productivity.

Since the required quantity of machining tools can be set up in advance, it is possible to respond quickly to changes in machined material and workpiece thickness. This greatly improves productivity in single-article multi-product production.

Since machining tools can be set up in advance, it is possible to use an automatic tool changer, enabling long, unattended operation.

Since the operation of centering the nozzle with the optical axis does not require much skill, even an unskilled operator can perform the operation.

The use of a safe low-power alternative light source allows the operator to work safely.

Since the nozzle presetter is of a tabletop type which can be moved manually, it increases flexibility of operations and does not unduly burden the operator.

DETAILED DESCRIPTION OF THE PREFERRED EMBODIMENTS

The present invention provides a nozzle presetter for laser machining tools used on the laser beam machine.

Figure 1:
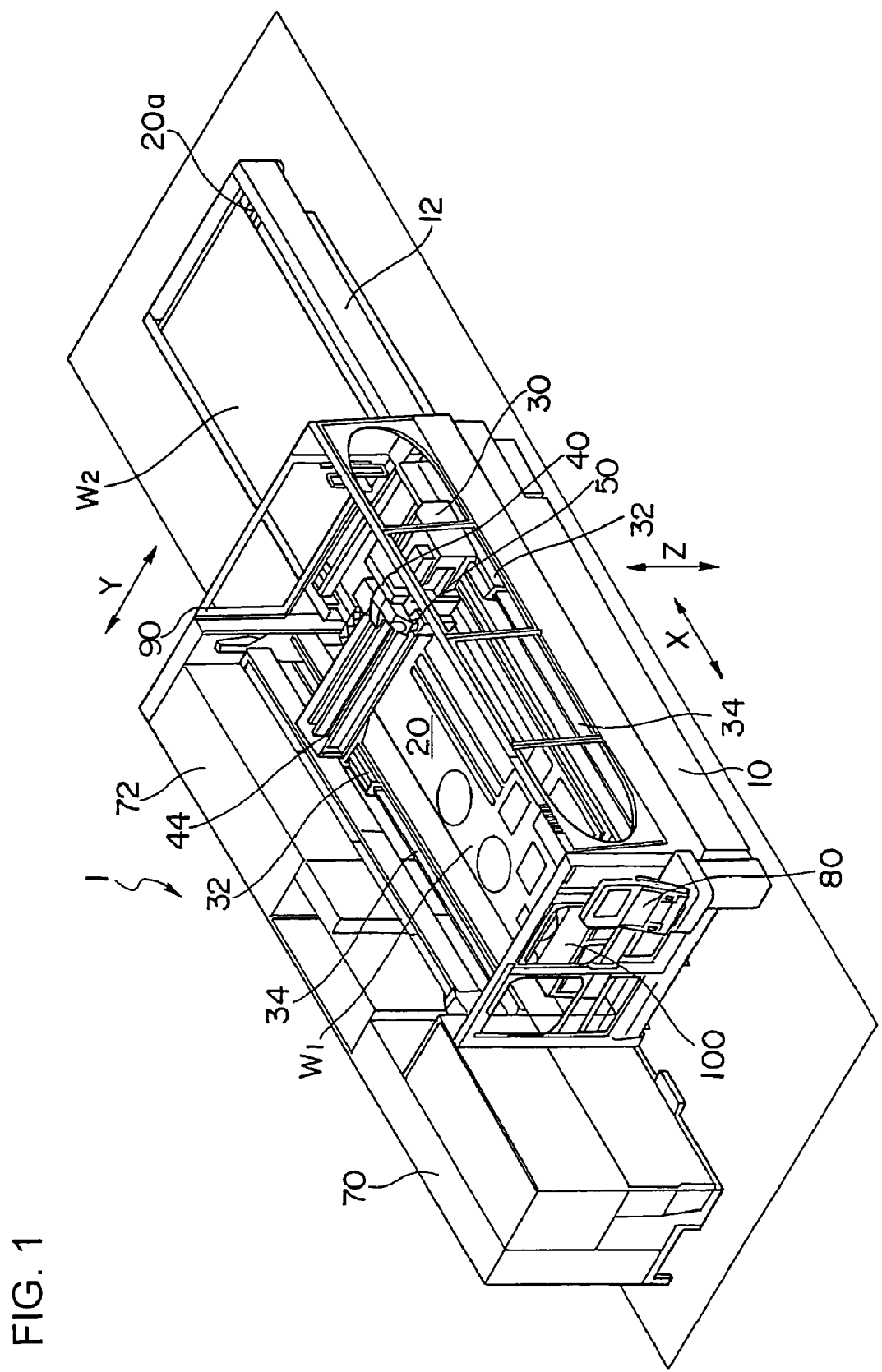
FIG. 1 is a perspective view showing an entire laser beam machine according to the present invention.
Figure 2:
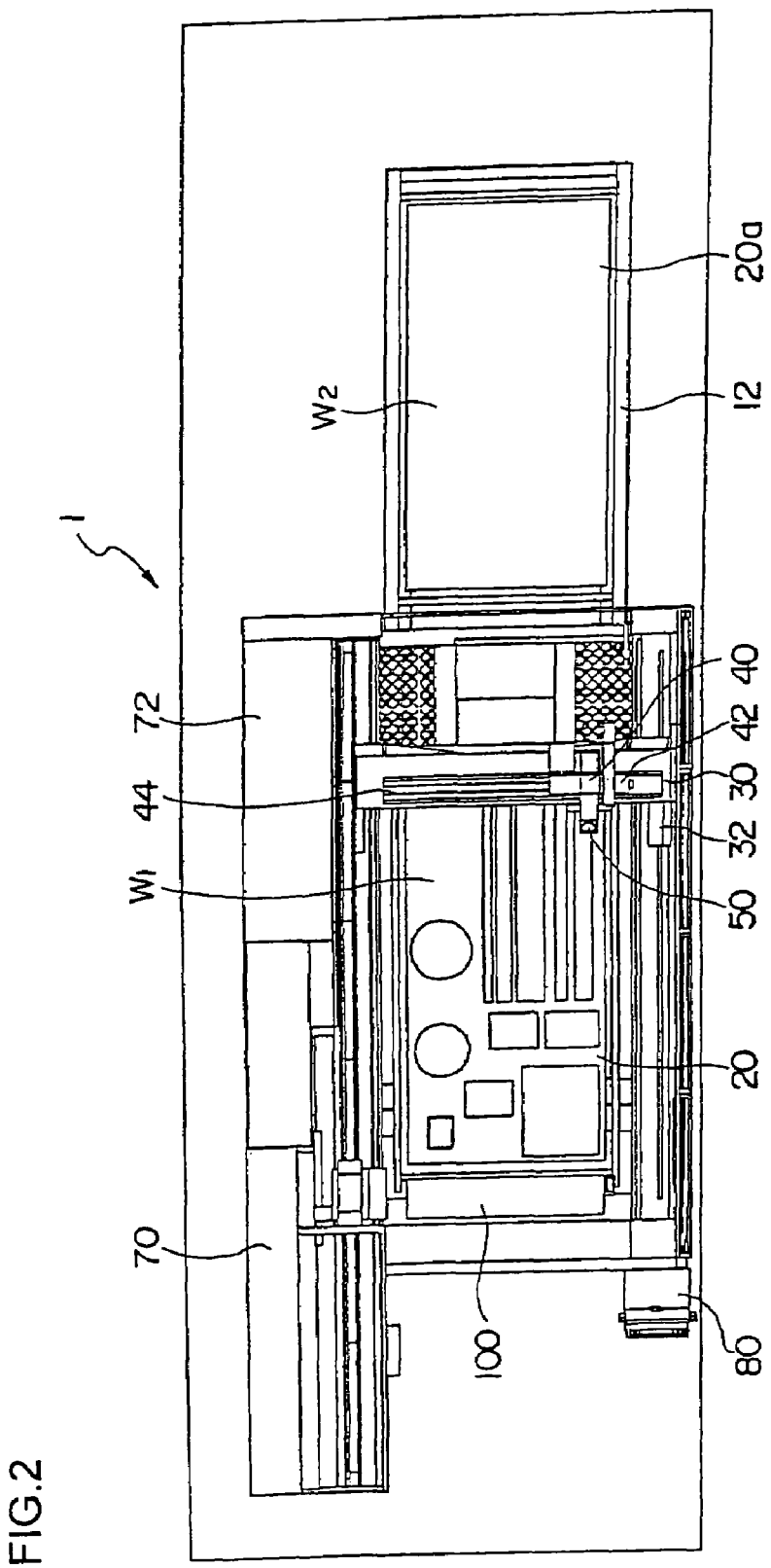
FIG. 2 is a plan view of the laser beam machine according to the present invention.
Figure 3:
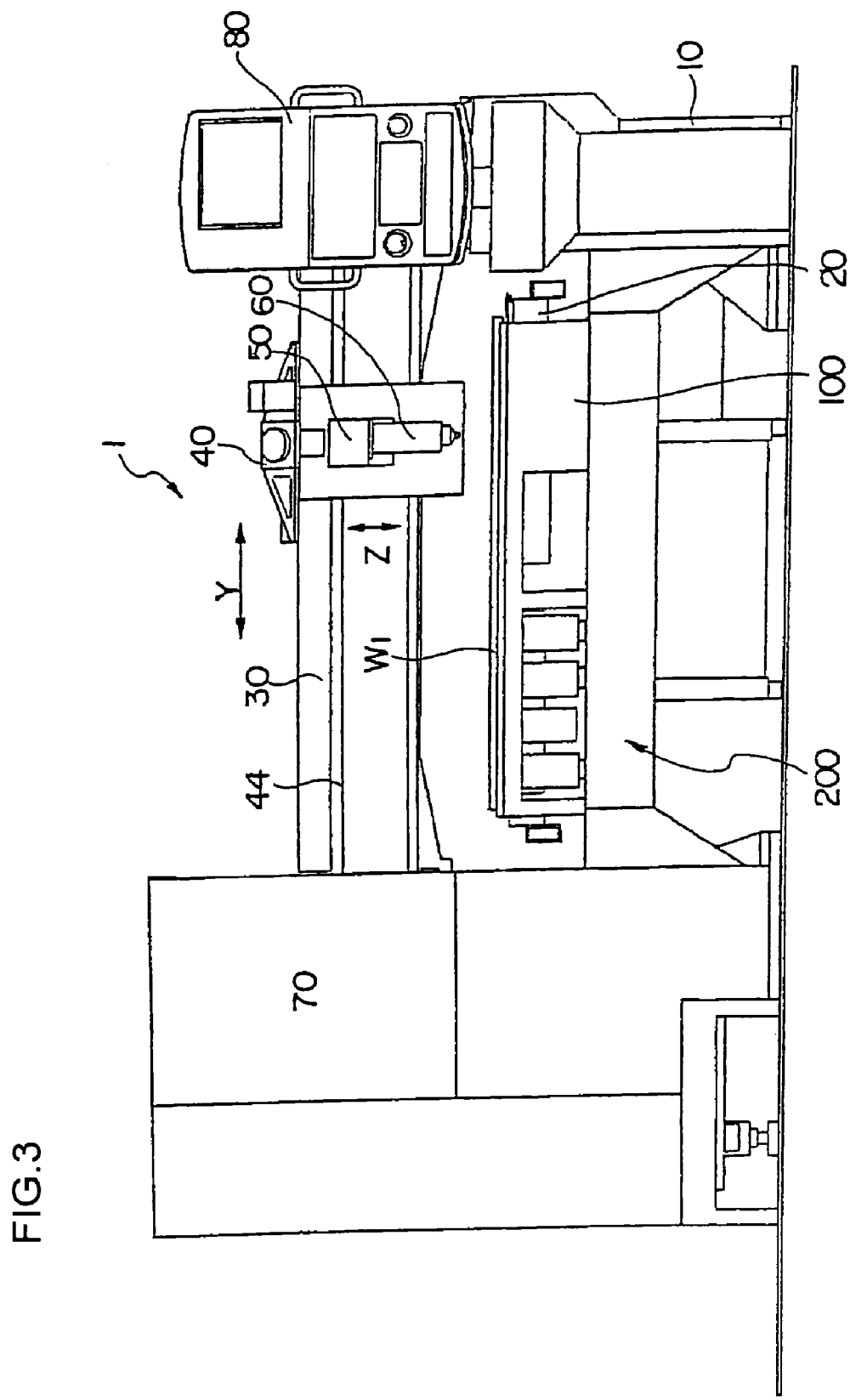
FIG. 3 is a front view of essential part of the laser beam machine according to the present invention.
Figure 4:
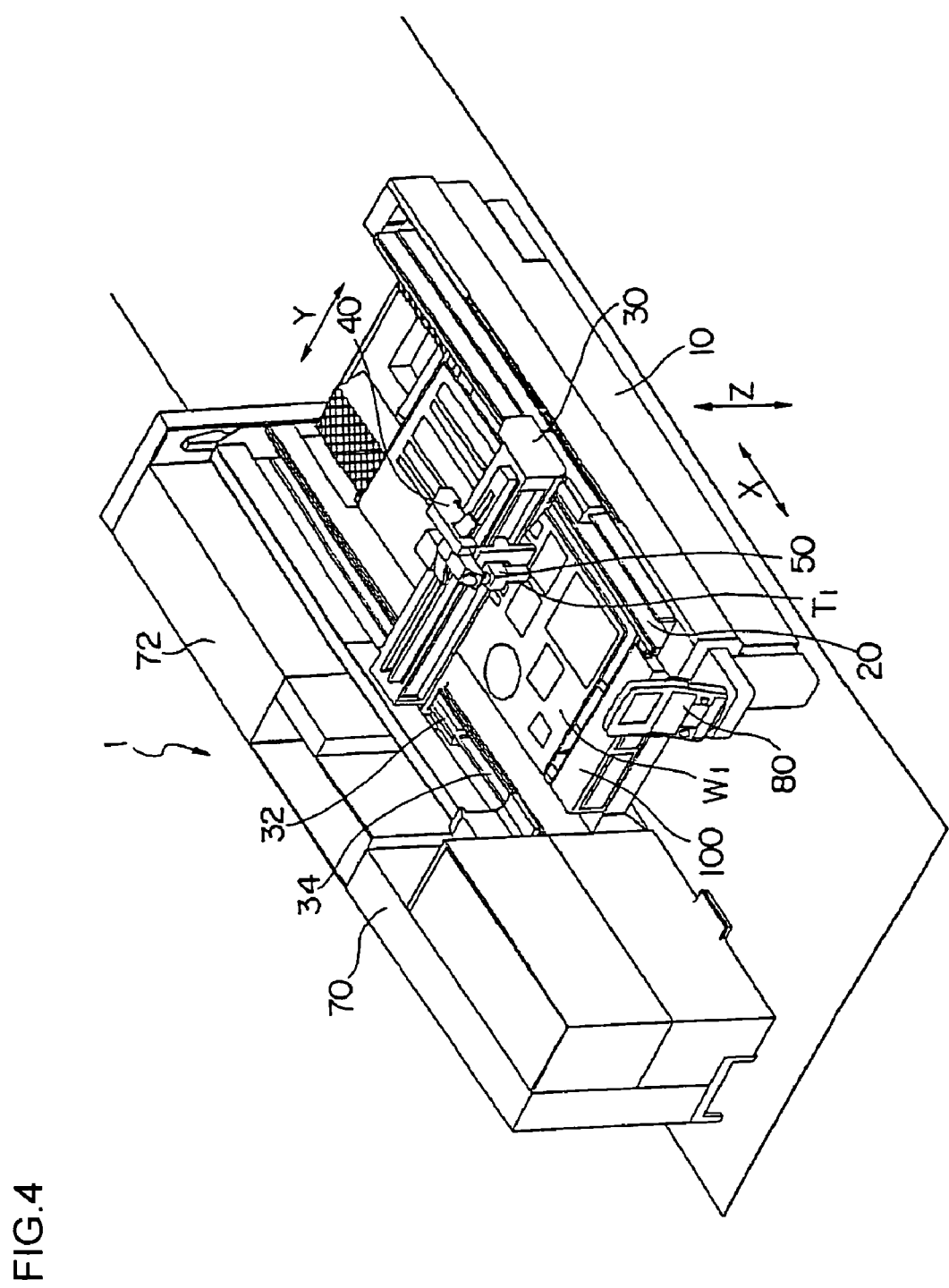
FIG. 4 is a perspective view of the essential part of the laser beam machine according to the present invention.
Figure 5:
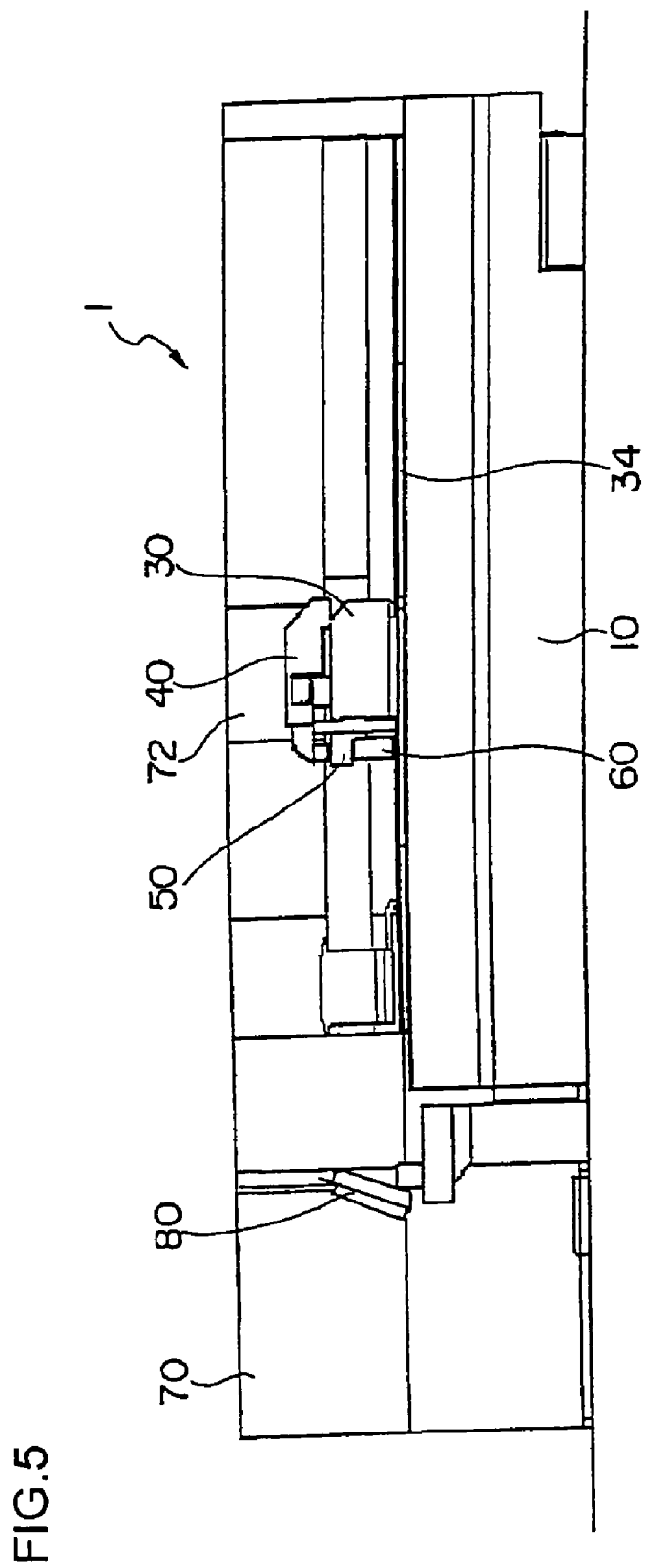
FIG. 5 is a side view of the essential part of the laser beam machine according to the present invention.
Figure 6:
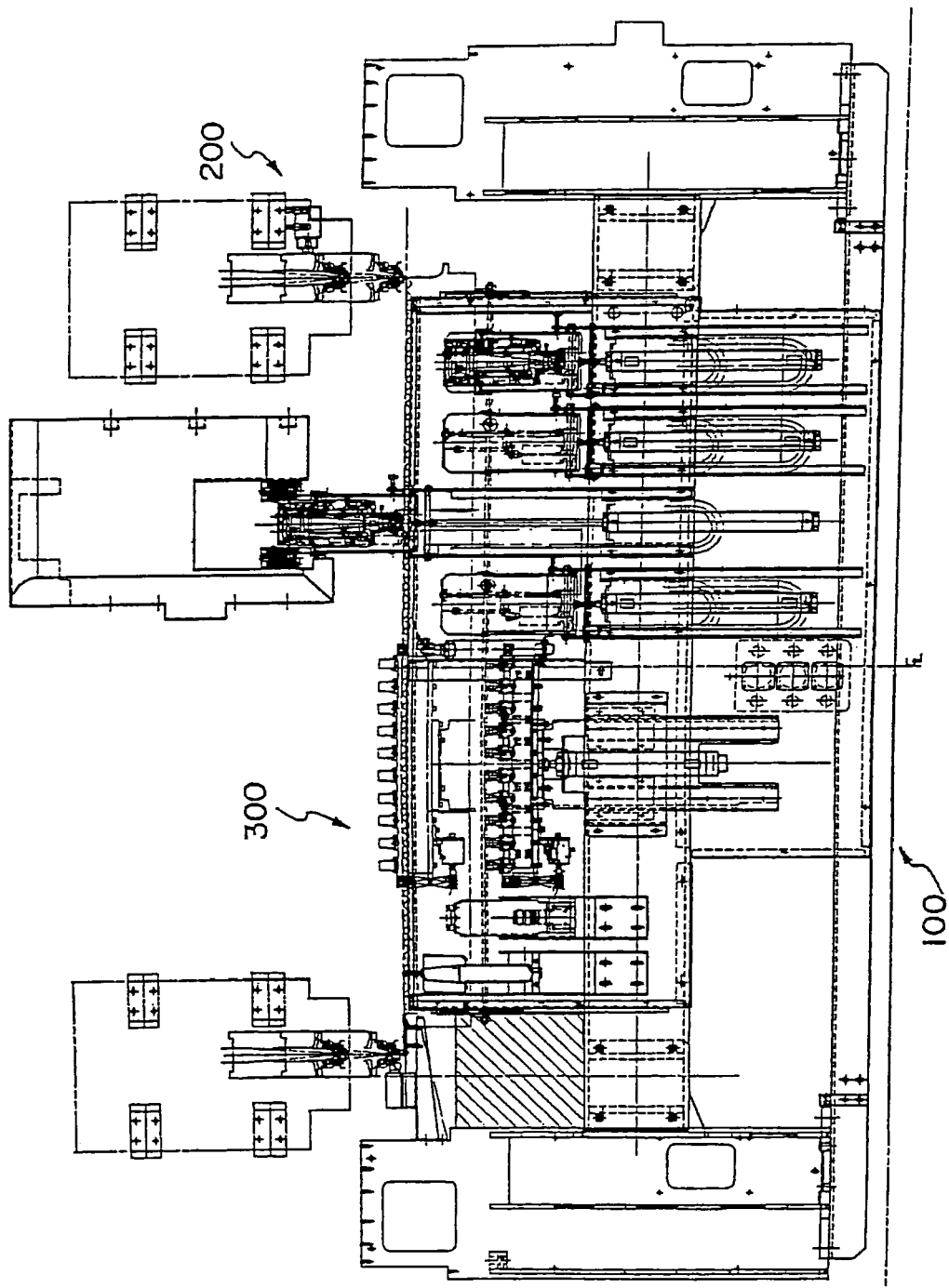
FIG. 6 is a front view of a setup station for laser machining tools.
Figure 7:
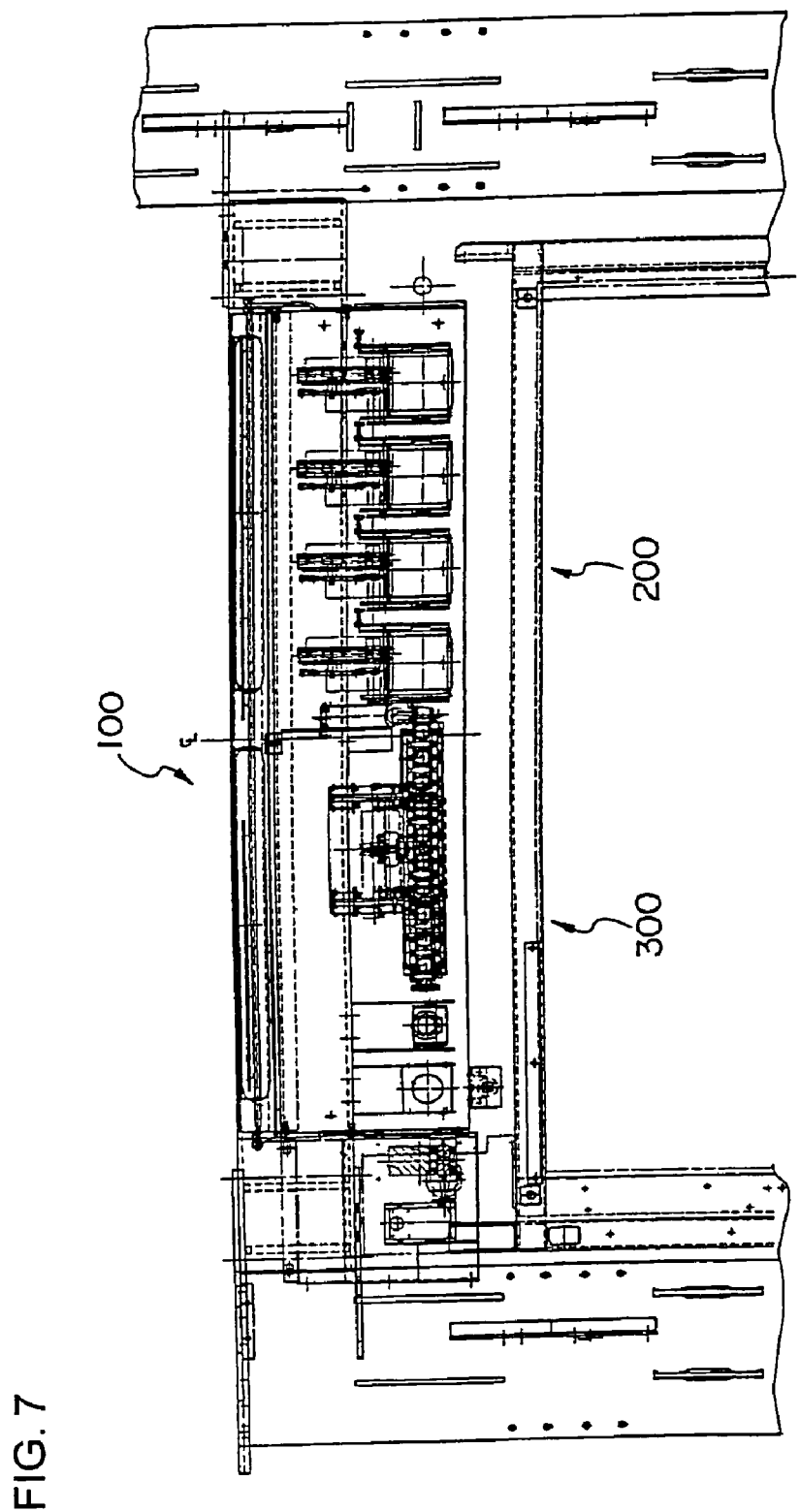
FIG. 7 is a plan view of the setup station for laser machining tools.
Figure 8:
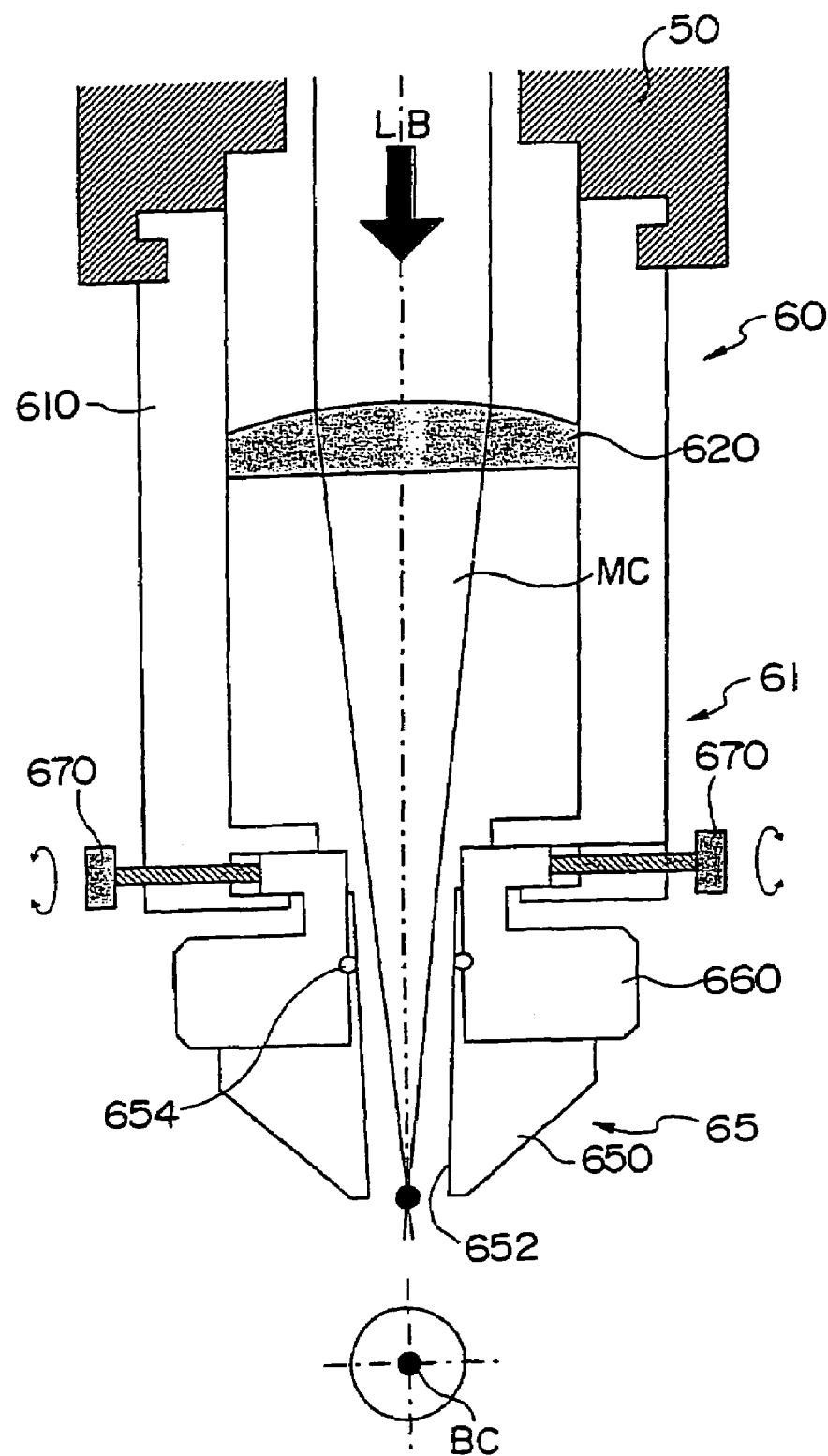
FIG. 8 is an explanatory diagram illustrating a principle of focal position adjustment on the laser beam machine.

FIG. 8 is an explanatory diagram illustrating a principle of focal position adjustment on the laser beam machine.

The laser machining tool 60 mounted on the machining head 50 consists of a torch member 61 and nozzle member 65.

The torch member 61 has a torch member body 610 and contains a machining lens 620.

A nozzle mounting member 660 is attached to the tip of the torch member 61 and screwed into the torch member body 610. Four adjustment screws 670 allow axial position to be adjusted. The nozzle member 65 is mounted on the nozzle mounting member 660. The nozzle member 65 has a nozzle hole 652 in its body 650 and is attached and detached to/from the nozzle mounting member 660 via mounting means 654.

A laser beam collected by a machining lens 620 forms a focus BC. Desirably the focus BC coincides with the machine center MC of the laser beam machine.

Figure 9:
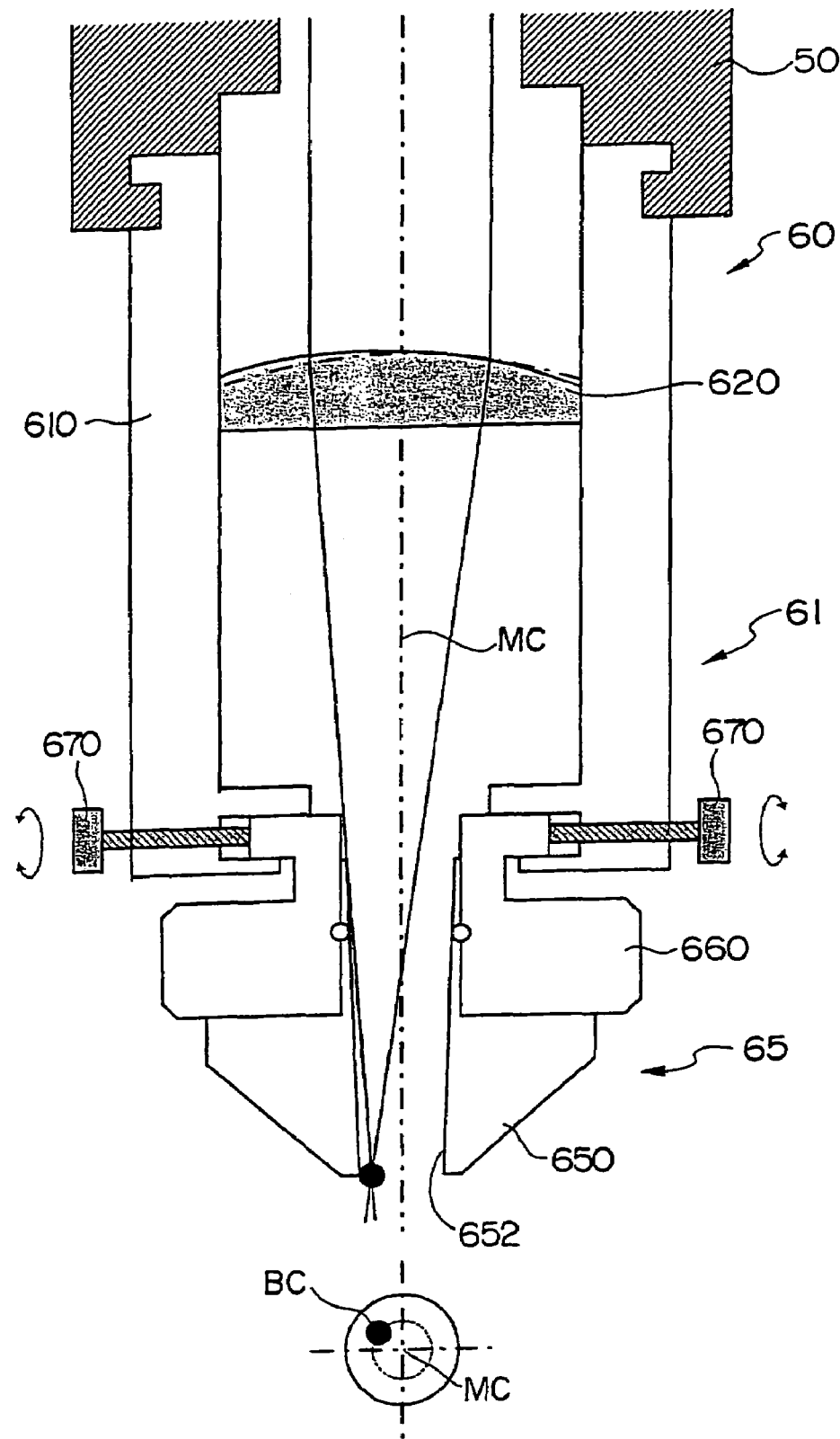
FIG. 9 is an explanatory diagram illustrating changes in focal position due to errors in a machining lens.

However, as shown in FIG. 9, the focus BC of the machining lens 620 mounted in the torch member body 610 often does not coincide with the machine center MC due to optical errors of the lens itself, mounting errors of the lens, etc.

Figure 10:
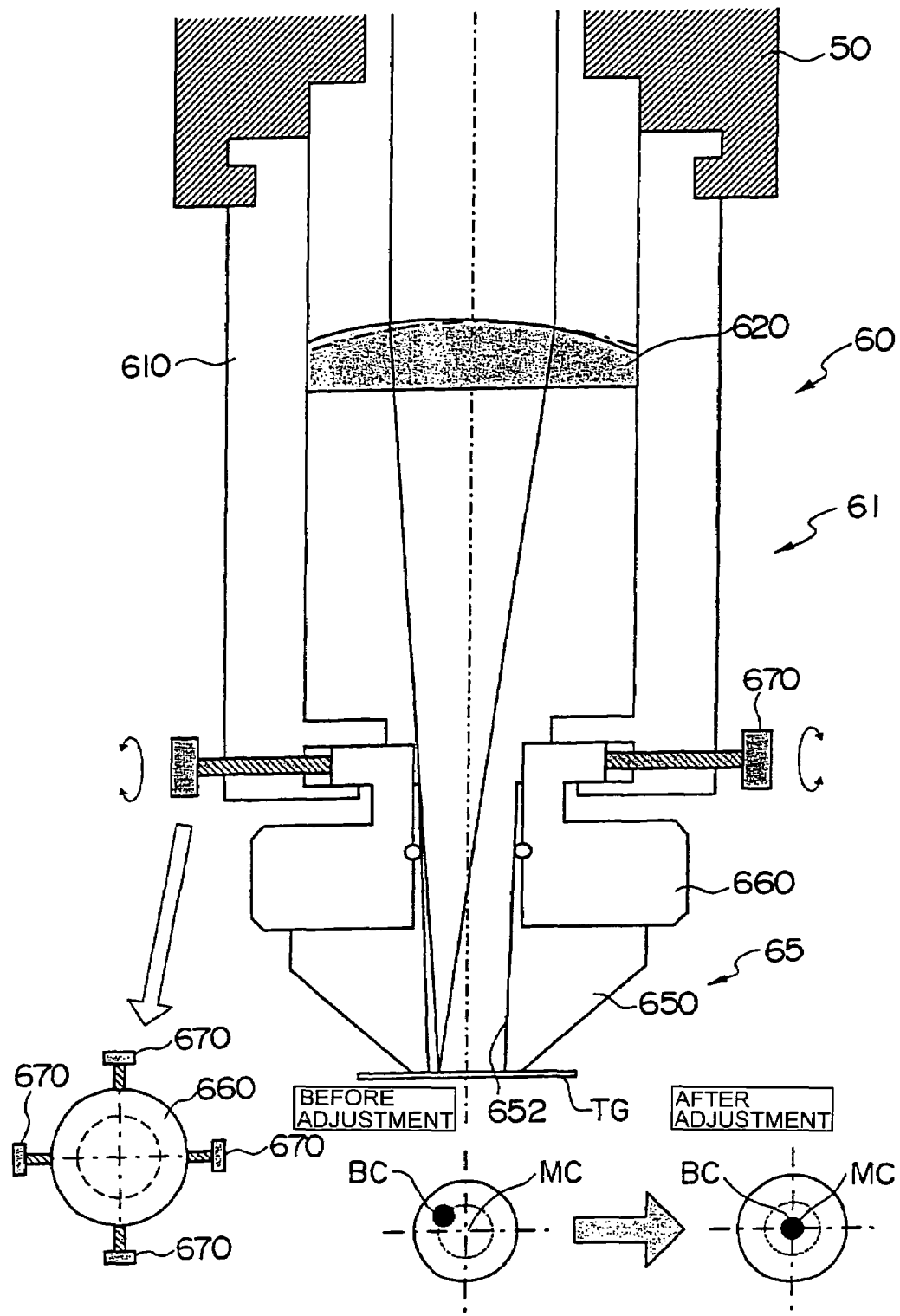
FIG. 10 is an explanatory diagram illustrating conventional nozzle adjusting means.

FIG. 10 is an explanatory diagram illustrating conventional adjustment means of center position of a nozzle.

Conventionally, a target TG made of paper or the like is pasted to an outlet portion of a nozzle hole 652 in a nozzle body 650 of a laser machining tool 60 mounted in a machining head 50 of a laser beam machine and is irradiated with a weak laser beam.

A mark is formed on the target TG by the focus BC. By looking at the position of the mark, the operator makes the machine center MC of a nozzle mounting member 660 coincide with the position of the focus BC using four adjustment screws 670.

However, this operation is performed on the actual machine, and thus laser machining is interrupted during that time.

The laser beam machine according to the present invention provides itself with a plurality of laser machining tools for replacement.

Thus, the present invention provides an apparatus for making position adjustments of the nozzles of the laser machining tools outside the machine.

Figure 11:
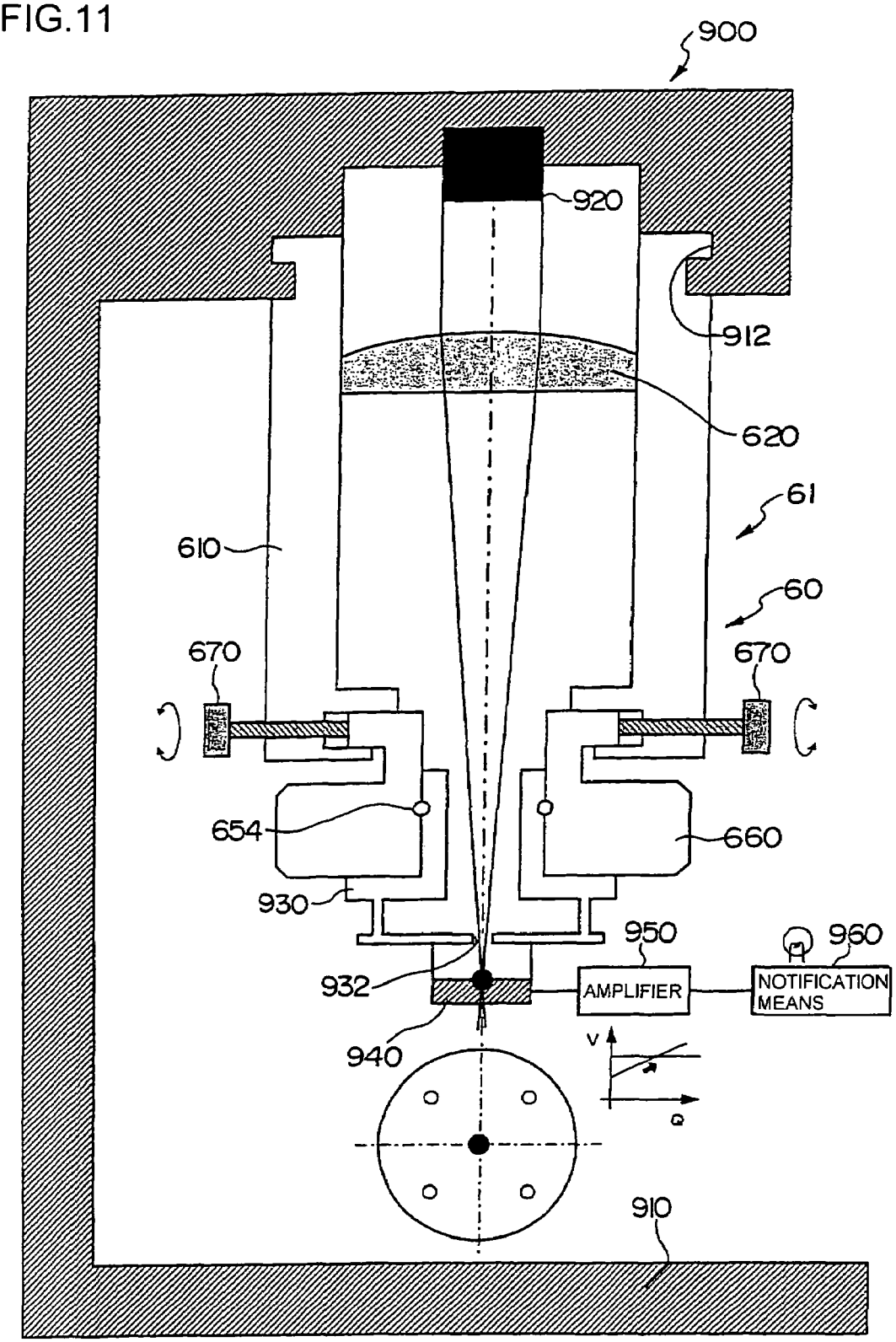
FIG. 11 is an explanatory diagram illustrating a configuration of the nozzle presetter according to the present invention.

FIG. 11 is an explanatory diagram illustrating a configuration of the nozzle presetter according to the present invention.

The nozzle presetter, generally denoted by reference number 900, has a base 910, and a support portion 912 is mounted on an upper part of the base 910 to removably support the laser machining tool 60.

An alternative beam source 920 is mounted at the center position in an upper part of the support portion 912. As the alternative beam source 920, a light-emitting source such as an LED or semiconductor laser is used instead of a laser oscillator device.

The laser machining tool 60 mounted on the base 910 of the nozzle presetter 900 has the mounting member 660 to support the body 610 of the torch member 61 and the nozzle portion. A target member 930 is removably mounted on the nozzle mounting member 660 via the mounting means 654. The target member 930 has a center hole 932, and a photoreceptor 940 is mounted just under the center hole 932. The photoreceptor 940 senses the quantity of light as a beam from the alternative beam source 920 collected by the machining lens 620 and reaches the photoreceptor 940 through the center hole 932 of the target member 930.

The photoreceptor 940 converts light into voltage and supplies the voltage to an amplifier 950. Output of the amplifier 950 is sent to notification means 960.

Figure 14:
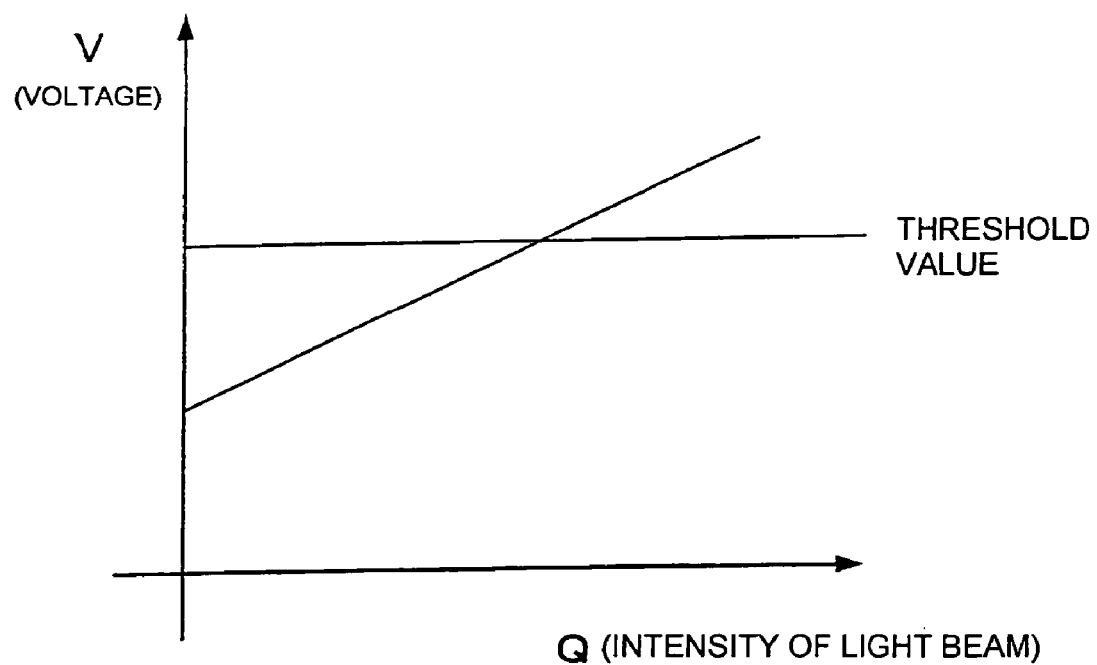
FIG. 14 is a diagram showing a relationship between intensity and voltage of a beam received by a photoreceptor.

FIG. 14 shows a relationship between the intensity Q and voltage V of the beam received by the photoreceptor 940.

Figure 12:
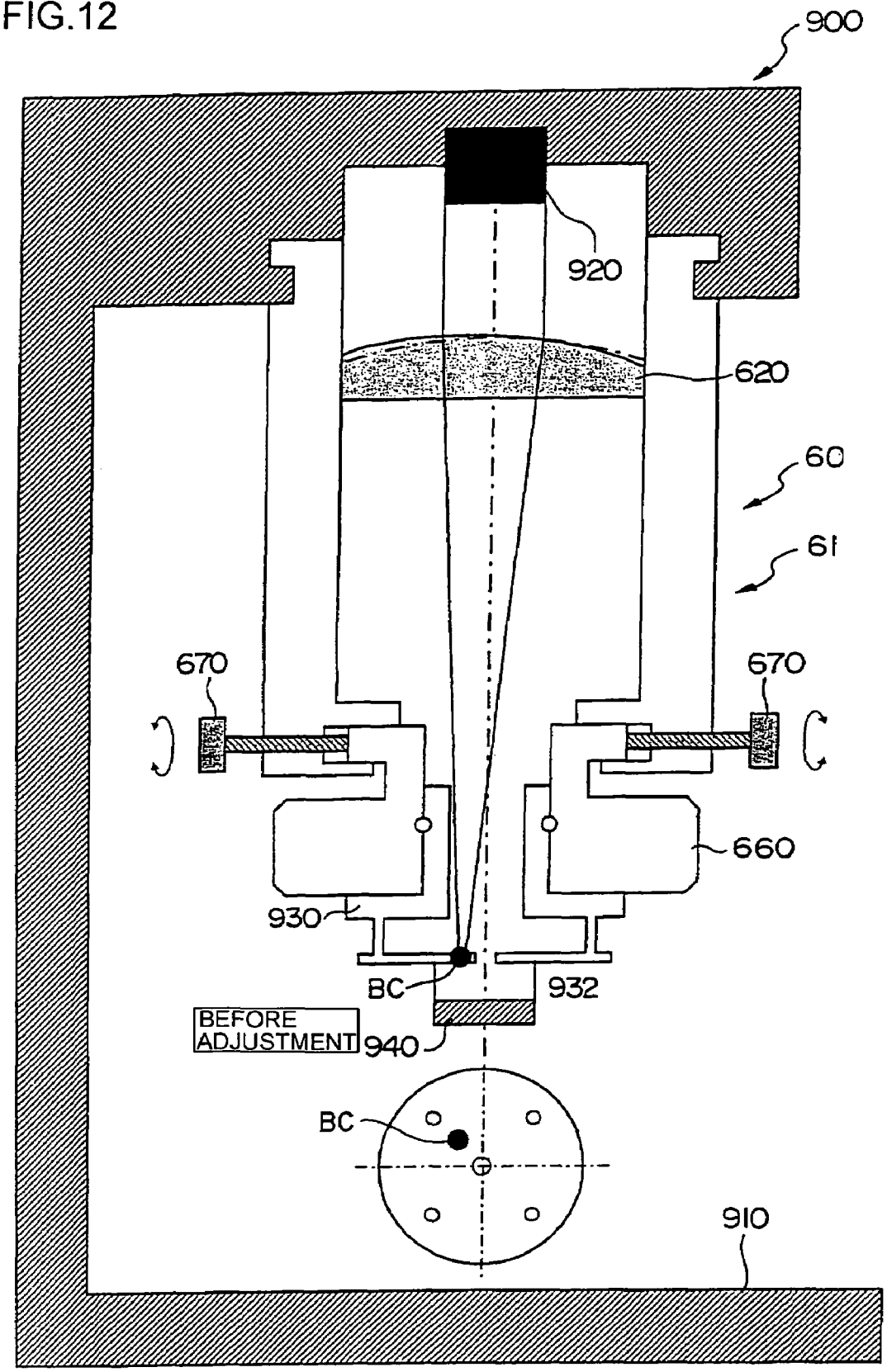
FIG. 12 is an explanatory diagram illustrating operation of the nozzle presetter according to the present invention.

FIG. 12 shows the nozzle presetter 900 according to the present invention on which a laser machining tool 60 yet to be adjusted is mounted.

Light from the alternative beam source 920 is collected by the machining lens 620 to form a focus BC on the target member 930.

In this state, only a small quantity of light passes through the center hole 932 of the target member 930. Consequently, the photoreceptor 940 generates a low voltage which does not reach a threshold shown in FIG. 14.

Figure 13:
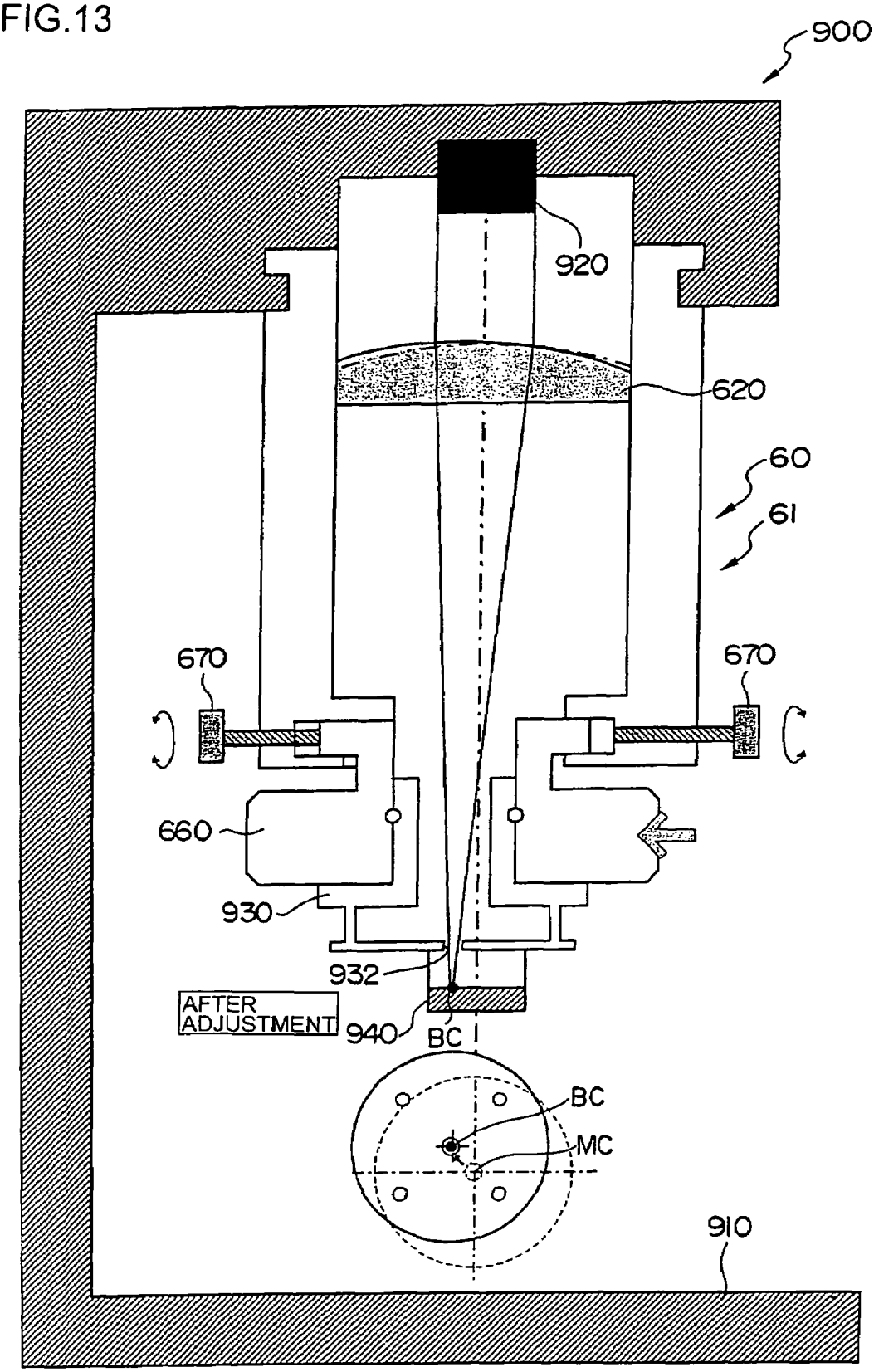
FIG. 13 is an explanatory diagram illustrating operation of the nozzle presetter according to the present invention.

To deal with this situation, the operator changes the axial position of the nozzle mounting member 660 using the four adjustment screws 670 as shown in FIG. 13. When the collected beam passes through the center hole 932 of the target member 930, the output voltage of the photoreceptor 940 rises. When the output voltage reaches or exceeds the threshold, the notification means notifies the operator by turning on a light or otherwise.

The operator knows from the notification that the nozzle mounting member 660 has centered with the optical axis of the machining lens 620 mounted on the torch member 610 and completes the adjustment.

With the laser machining tool preset outside the machine through the operations described above, when a machining nozzle is mounted on the nozzle mounting member 660 instead of the target member 930, the nozzle is centered with the optical axis of a machining lens 620 unique to the torch member 61.

Thus, even if the laser machining tool on the machining head 50 is replaced with any other one, a predetermined laser beam output can be maintained to continue proper machining.

Also, the laser machining tools are preset offline outside the machine, ensuring safety and improving productivity.

Incidentally, although a linear motor has been cited in the above example as a driving means along the X and Y axes, the present invention can also be applied using a ball screw.

What is claimed is:

1. A nozzle presetter for a laser machining tool of a laser beam machine, where the nozzle presetter externally adjusts the machining tool replaceably mounted on the laser beam machine, characterized by comprising a base on which the machining tool is removably mounted, an alternative beam source which is mounted on top of the base and emits a beam in place of a laser beam, a nozzle support member mounted on a body of the machining tool via position adjusting means, a target member removably mounted on the nozzle support member; a photoreceptor installed in opposing relation to a small hole provided in the center of the target member; an amplifier which amplifies output voltage of the photoreceptor; and notification means which displays output of the amplifier.

2. The nozzle presetter for a laser machining tool of a laser beam machine according to claim 1, characterized in that the position adjusting means of the nozzle support member is four adjustment screws installed at equal intervals around outside the body of the machining tool.

3. The nozzle presetter for a laser machining tool of a laser beam machine according to claim 1, characterized in that the alternative beam source is a photoreceptor.

4. The nozzle presetter for a laser machining tool of a laser beam machine according to claim 1, characterized in that the laser beam machine comprises a bed, a pallet which is disposed on the bed and holds a workpiece, a column which moves along an X axis, that is, in a longitudinal axis of the bed, a saddle which is supported by the column and moves along a Y axis orthogonal to the X axis, a machining head which is supported by the saddle and moves along a Z axis perpendicular to a plane formed by the X axis and Y axis, and a tool change magazine disposed at an automatic tool change position outside a machining area.

5. The nozzle presetter for a laser machining tool of a laser beam machine according to claim 1, characterized in that the laser machining tool comprises a torch which has optical means including a condenser lens, and a nozzle which is replaceably attached to the tip of the torch.

* * * * *